United States Patent
Abe

(10) Patent No.: US 6,820,162 B1
(45) Date of Patent: Nov. 16, 2004

(54) QUEUE CONTROL DEVICE FOR AND QUEUE CONTROL METHOD OF CONTROLLING A PLURALITY OF QUEUES

(75) Inventor: Kohei Abe, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 482 days.

(21) Appl. No.: 09/665,165

(22) Filed: Sep. 19, 2000

(30) Foreign Application Priority Data

Sep. 27, 1999 (JP) .......................................... 11-273219

(51) Int. Cl.[7] .......................... G06F 13/36; H04L 12/56
(52) U.S. Cl. ..................................... 710/310; 370/412
(58) Field of Search .......................... 710/310, 52, 57; 370/428, 411–419, 395.1, 395.31, 395.32, 395.54; 709/238, 242, 245, 250, 202

(56) References Cited

U.S. PATENT DOCUMENTS 5,521,916 A * 5/1996 Choudhury et al. ........ 370/414
5,850,395 A * 12/1998 Hauser et al. ............... 370/398
5,854,791 A   12/1998 Abe
6,219,352 B1 * 4/2001 Bonomi et al. ............. 370/417
6,523,060 B1 * 2/2003 Kao ........................... 370/413

FOREIGN PATENT DOCUMENTS

WO          WO 99/26378          5/1999

* cited by examiner

Primary Examiner—Khanh Dang
(74) Attorney, Agent, or Firm—Oblon, Spivak, McClelland, Maier & Neustadt, P.C.

(57) ABSTRACT

In the tail address in a first queue in a pointer table, the head address in a second queue is stored as pointer information. In the tail address in the second queue, the tail address in the first queue is stored as pointer information. Pointer information about the head address in the first queue is stored in the head address in a storage area. In the tail address, pointer information about the tail address in the second queue is stored.

24 Claims, 7 Drawing Sheets

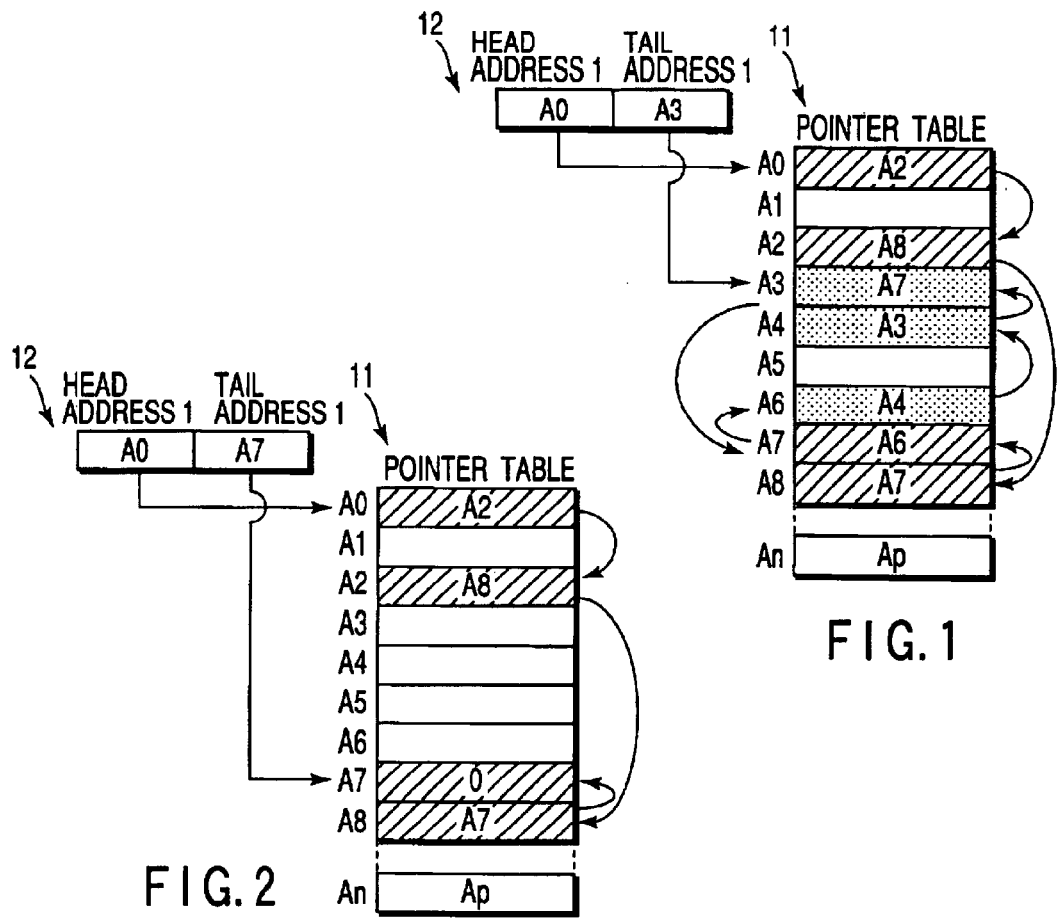
F I G. 1
F I G. 2
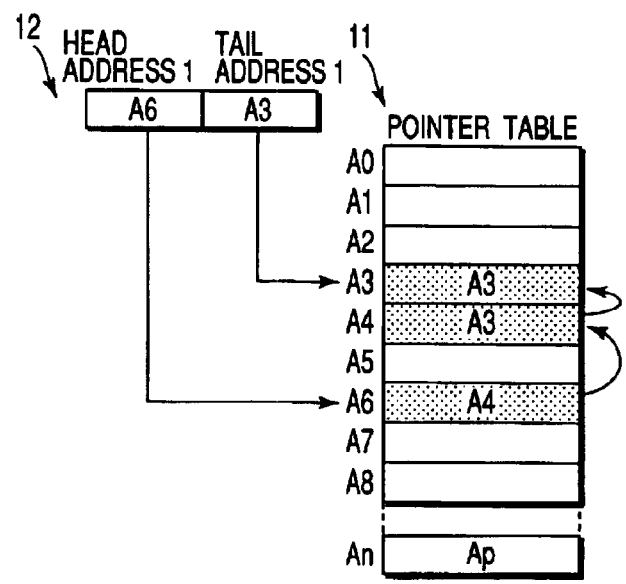
F I G. 3

QUEUE CONTROL DEVICE FOR AND QUEUE CONTROL METHOD OF CONTROLLING A PLURALITY OF QUEUES

CROSS-REFERENCE TO RELATED APPLICATIONS

This application is based upon and claims the benefit of priority from the prior Japanese Patent Application No. 11-273219, filed Sep. 27, 1999, the entire contents of which are incorporated herein by reference.

BACKGROUND OF THE INVENTION

This invention relates to a queue control device and a queue control method which are applied to, for example, ATM (Asynchronous Transfer Mode) communications and computers.

FIG. 7 shows a conventional queue management method. The queue management method includes a pointer table 101 having an n number of addresses and a storage area 102 that stores the head address and tail address for the queue in the pointer table 101. When a queue is constructed for an n number of elements, address A0 to address An are allocated to the individual elements in the pointer table 101. In each address in the pointer table 101, pointer information indicating the next element for constituting the queue is stored. The storage area 102 stores the head address and tail address. The head address indicates the head element in the queue in the pointer table 101 and the tail address indicates the tail element. Using these addresses, the queue is managed.

For example, in the example of FIG. 7, address A0 in the pointer table has been stored in the head address in the storage area 102 and address A7 has been stored in the tail address. In address A0 in the pointer table 101 indicated by the head address, pointer information A2 indicating the address for the next element has been stored. Furthermore, pointer information A8 indicating the address for the next element has been stored in address A2 in the pointer table 101 and pointer information A7 indicating the tail address is stored in address A8 in the pointer table 101. Since address A7 in the pointer table 101 is the tail address, it has not next pointer information and have 0 indicating the end of the queue stored in it. In this way, a queue consisting of addresses A0→A2→A8→A7 is constructed.

The queue is accessed sequentially, starting at address A0. After the process corresponding to address A0 has been completed, the pointer information corresponding to address A0 is deleted from the queue and the head address is updated from A0 to A2.

There are two methods of adding new elements to the queue as follows. When element Ai is added to an FIFO (First In First Out) queue, pointer information indicating Ai is stored in the tail address A7 of the pointer table 101 and the tail address of the storage area 102 is updated from A7 to Ai. On the other hand, when element Ai is added to an LIFO (Last In First Out) queue, pointer information indicating the head address A0 is stored in Ai of the table 101 and the head address of the storage area 102 is updated from A0 to Ai.

FIG. 8 shows a queue management method for managing two types of queues. To manage a first and a second queue, two storage areas 111, 112 are provided. The storage area 111 holds the head address 1 and tail address 1 in the first queue. The first queue is managed using the head address 1 and tail address 1. The storage area 112 holds the head address 2 and tail address 2 in the second queue. The second queue is managed using the head address 2 and tail address 2.

Now, consider a case where queues are managed in a communication control system with, for example, an n number of communication channels. For example, in ATM communications, virtual channels are shared on one physical line, and packet is changed into ATM cell and transmits in the virtual channel. A bandwidth used by each virtual channel is classified into some groups corresponding to the application of each virtual channel, and each group is controlled according to a priority. That is, channels of each group are managed by the queue and each group is controlled according to the priority.

FIG. 9 shows the queue management method. In FIG. 9, a time table is provided in a storage area 121. The time table has an m number of time entries T0 to Tm. Each channel is serviced in this order of T0 to Tm of the m number of entries. In each of the time entries T0 to Tm, the head address and tail address of a queue for a virtual channel serviceable at each time have been stored. For example, at time entry T0, Ah1-0 (=A0) has been stored in the head address and At1-0 (=A2) has been stored in the tail address. Moreover, at time entry T1, Ah1-1 (=A3) has been stored in the head address and At1-1 (=A3) has been stored in the tail address.

On the other hand, according to the head address and tail address at each of the entries, the pointer indicating the next element and information indicating the end have been stored in the pointer table 122.

Each channel is served in order from time entry T0 in the time table. After service has been given at time entry Tm, service is given, starting at time entry T0 again. After the virtual channel registered in a certain entry has been given service, the virtual channel is registered in another time entry. If another virtual channel has been registered in that time entry, the virtual entry will constitute a queue at that time entry.

Consider a case where two types of virtual channels differing in priority are controlled in such a communication control device. As shown in FIG. 9, when there is only one queue at time entries T0 to Tm, control can be performed only by FIFO or LIFO. This causes a problem: the two types of virtual channels cannot be controlled independently on the basis of their priority.

To overcome this problem, as shown in FIG. 10, a queue control method having two sets of head addresses and tail addresses for each of the time entries T0 to Tm is needed. The method is based on the method shown in FIG. 8. In the example shown in FIG. 10, there are a first queue and a second queue for each of the time entries T0 to Tm. With the first queue and second queue, two types of virtual channels differing in priority can be controlled as shown in the pointer table 122. Specifically, for example, at time entry T0, the first queue specified by the head address Ah1-0 (=A0) and tail address At1-0 (=A2) is processed. Then, the second queue specified by the head address Ah2-0 (=A1) and tail address At2-0 (=A5) is processed.

As shown in FIG. 10, however, when two types of queues composed of the first queue and second queue are managed using the m number of time entries T0 to Tm, the storage area 123 requires an area for storing 4×m head addresses and tail addresses. This leads to a problem: the storage capacity of the storage area 123 increases.

BRIEF SUMMARY OF THE INVENTION

It is, accordingly, an object of the present invention to overcome the above problem by providing a queue control device and a queue control method which are capable of preventing the storage capacity from increasing by controlling a plurality of queues as a single queue.

The foregoing object is accomplished by providing a queue control device comprising: a first storage area for storing a first and a second queue, the first queue including a plurality of elements, each of the elements having an address specifying the next element, and the second queue including a plurality of elements, each of the elements having an address specifying the next element; a second storage area for storing first pointer information and second pointer information, the first pointer information being a head address specifying the head element in the first queue, and the second pointer information being a tail address specifying the tail element in the second queue; and a controller which controls the first and second storage areas and which sets not only an address specifying the head element in the second queue in the tail element in the first queue stored in the first storage area but also an address specifying the tail address in the first queue in the tail element in the second queue and controls the first and second queues according to the first pointer information and second pointer information stored in the second storage area.

The foregoing object is further accomplished by providing a queue control method including a first queue composed of a plurality of elements, each of the elements having an address specifying the next element, and a second queue composed of a plurality of elements, each of the elements having an address specifying the next element, the queue control method comprising the steps of: setting an address specifying the head element in the second queue in the tail element in the first queue; setting an address specifying the tail element in the first queue in the tail element in the second queue; processing the first and second queues on the basis of first pointer information made up of the head address in the first queue and second pointer information made up of the tail address in the second queue.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing a queue control method according to an embodiment of the present invention;

FIG. 2 is a diagram showing a queue control method when there is no second queue in the present invention;

FIG. 3 is a diagram showing a queue control method when there is no first queue in the present invention;

DETAILED DESCRIPTION OF THE INVENTION

Figure 4:
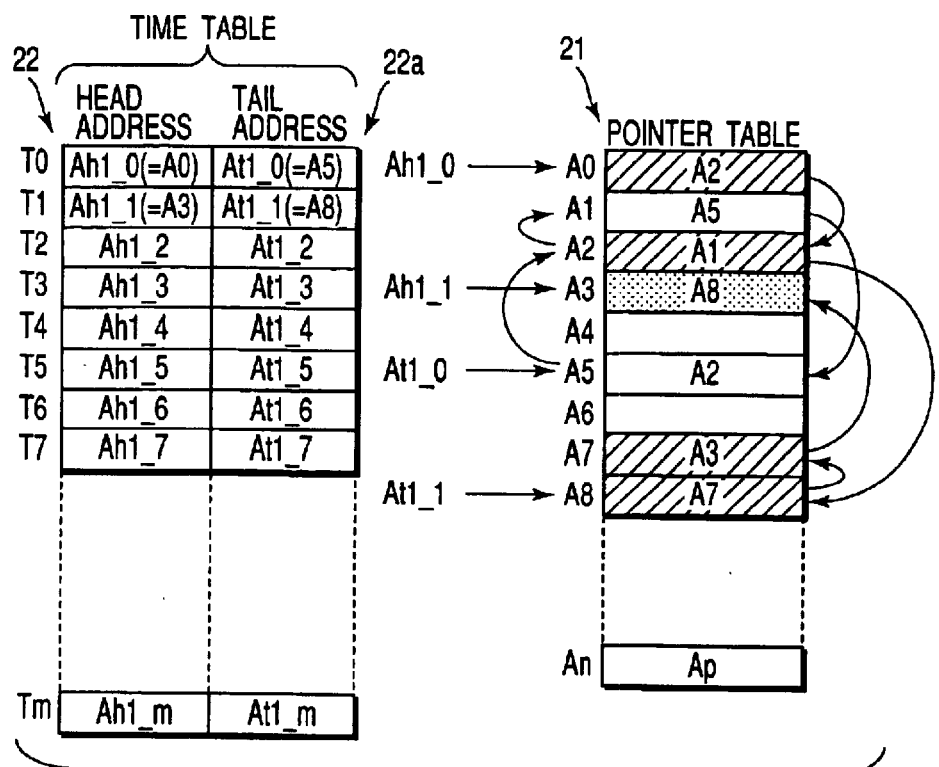
FIG. 4 is a diagram showing a method of controlling two sets of queues using a plurality of time entries in the present invention.

Hereinafter, referring to the accompanying drawings, an embodiment of the present invention will be explained.

FIG. 1 shows the structure of a queue according to the present invention. In FIG. 1, the elements constituting a first and a second queue have been stored in a pointer table 11. Specifically, the elements of the first queue have been stored in addresses A0, A2, A7, and AB and the elements of the second queue have been stored in addresses A3, A4, and A6. In each address, pointer information indicating the address for the next address has been stored. That is, the first queue is composed of A0→A2→A8→A7 and the second queue is composed of A6→A4→A3. In this case, the head address A6 in the second queue is stored as pointer information in the tail address A7 in the first queue and the tail address A7 in the first queue is stored as pointer information in the tail address A3 in the second queue.

In a storage area 12, the head address and tail address are stored. Pointer information indicating the head address A0 in the first queue is stored in the head address and pointer information indicating the tail address A3 in the second queue is stored in the tail address.

With such a structure, the first and second queues can be constructed into a single queue. Moreover, the first and second queues can be processed using only a set of the head address and tail address stored in the storage area 12. Specifically, after the first queue has been processed according to the head address stored in the storage area 12, the second queue can be processed automatically.

When the first queue and second queue need to be separated, pointer information A7 stored in address A3 in the pointer table 11 indicated by the tail address A3 in the storage area 12 is read. Then, pointer information A6 stored in the address A7 specified by pointer information A7 is taken out. This makes it possible to distinguish the end of the first queue and the beginning of the second queue. As a result, the first queue consisting of the head address A0→A2→A8→A7 can be separated from the second queue consisting of pointer information A6 to the tail address A3, or A6→A4→A3. After the first and second queues have been separated, each of the first and second queues can be subjected to an FIFO or LIFO process. When the first and second queues need to be connected again into a single queue, they have only to be connected again by the method of the present invention.

For example, when only the first queue is present as shown in FIG. 2, A0 representing the head address in the first queue is stored as pointer information in the head address in the storage area 12 and A7 representing the tail address in the first queue is stored as pointer information in the tail address. Pointer information indicating that only the first queue is present, for example, "0," is set in A7 representing the tail address in the pointer table 11.

On the other hand, when only the second queue is present as shown in FIG. 3, A6 representing the head address in the second queue is stored as pointer information in the head address in the storage area 12 and A3 representing the tail address in the second queue is stored as pointer information in the tail address. The value indicating that only the second queue is present, for example, pointer information "A3" about the tail address A3, is set in A3 representing the tail address in the pointer table 11.

With this structure, two queues can be managed using a set of the head address and tail address.

FIG. 4 shows a case where virtual-channel queues differing in priority are managed using the present invention in a communication control system with, for example, an n number of communication channels.

In FIG. 4, numeral 21 indicates a pointer table and 22 indicates a storage area. In the storage area 22, a time table 22a is provided. The time table 22a have an m number of time entries T0 to Tm. Each channel is serviced in this order of T0 to Tm of the m number of entries. In each of the time entries T0 to Tm, the head address and tail address of a queue for a virtual channel serviceable at each time have been stored.

For example, at time entry T0, pointer information Ah1-0 (=A0) representing the head address in the first queue (A0→A2) with a first priority has been stored in the head address. In the tail address, pointer information At1-0 (=A5) representing the tail address in the second queue (A1>A5) with a second priority lower in level than the first priority has been stored. In address A5 in the pointer table 21, pointer information A2 representing the tail address in the first queue with the first priority has been stored.

Moreover, at time entry T1, pointer information Ah1-1 (=A3) representing the head address in the first queue (A3→A8) has been stored in the head address. In the tail address, pointer information At1-1 (=A8) representing the tail address in the second queue (A7→A3) has been stored. In address A3 in the pointer table 21, pointer information A8 representing the tail address in the first queue has been stored.

Figure 10:
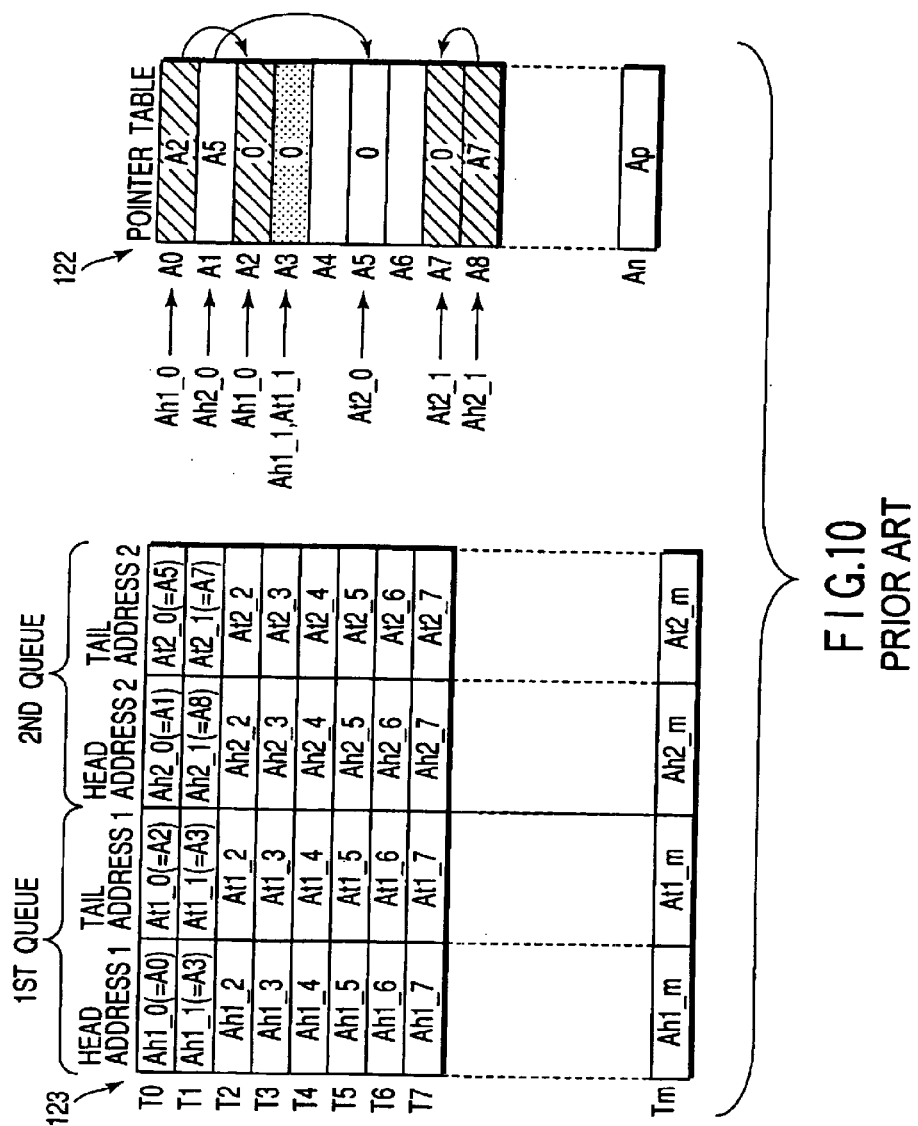
FIG. 10 is a diagram showing a conventional method of controlling two queues using a plurality of time entries.

By constructing the time table 22a in the storage area 22 and the pointer table 21 as described above, 2×M sets of head addresses and tail addresses are required for an m number of time entries in the present embodiment, when the first and second virtual-channel queues differing in priority are managed, as compared with a conventional equivalent where 4×M sets of head addresses and tail addresses are required for an m number of time entries. Because in the embodiment, the two queues can be controlled only by the head addresses and tail addresses used to control a single queue, the capacity of the storage area 22 can be reduced to ½ of that shown in FIG. 10.

Conversely, in a case where a queue for a low-priority communication channel is made up of the first queue and a queue for a high-priority communication channel is made up of the second queue and then these queues are connected as described above into a single queue, the first and second queues are separated by the above method according to the head addresses and tail addresses registered in the m number of time entries, which enables service to be given by the communication channel registered in the first queue with the high priority.

Figure 5:
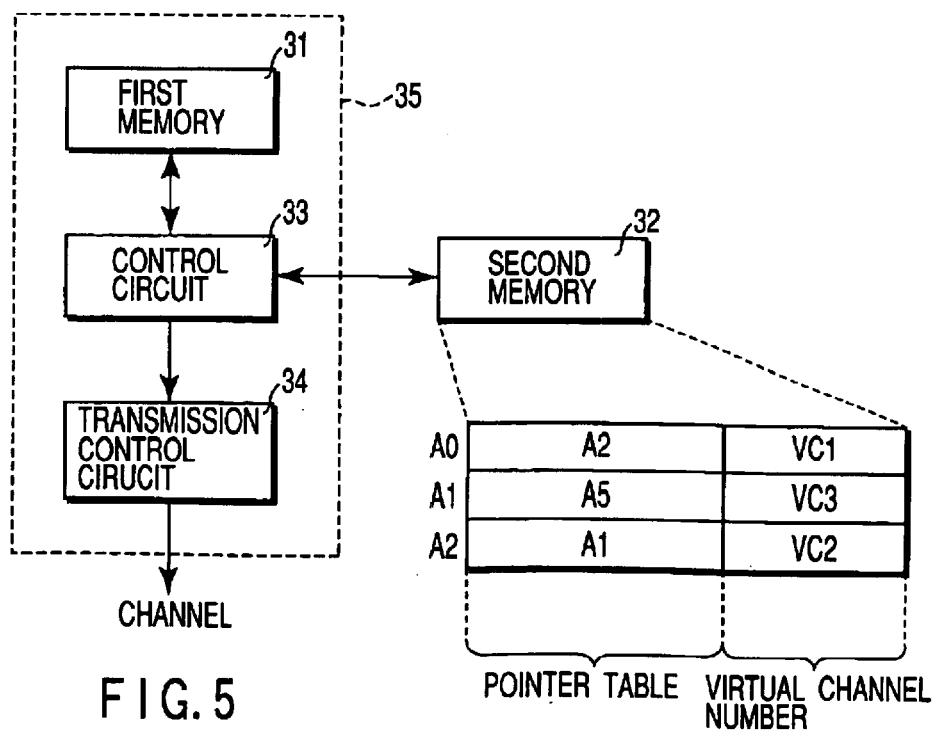
FIG. 5 shows the configuration of an embodiment of a queue control device according to the present invention.

FIG. 5 shows an embodiment of a queue control device applied to the present invention. In FIG. 5, a first memory 31 is composed of, for example, a RAM (random access memory). The first memory 31 corresponds to, for example, the storage area 22 shown in FIG. 4 and stores the time table 22a. A second memory 32 is composed of, for example, a RAM, and stores, for example, the pointer table 21 shown in FIG. 4. A control circuit 33 is composed of, for example, a microprocessor. The control circuit 33 subjects the time table 22a and the first and second queues in the pointer table 21 to the processes shown in FIGS. 1 to 3.

Figure 6A:
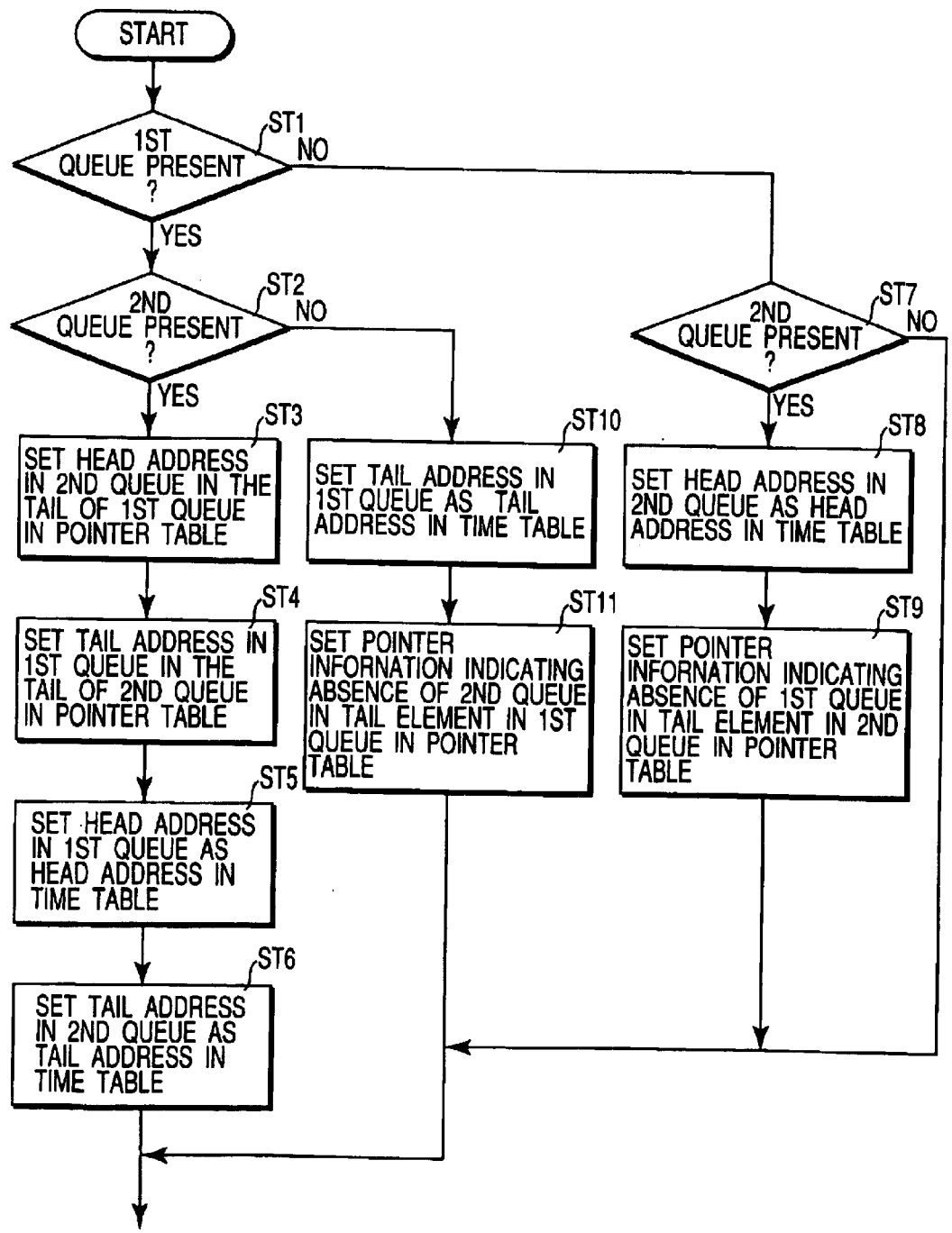
FIGS. 6A and 6B are flowcharts for the operation of the control circuit of FIG. 5.
Figure 6B:
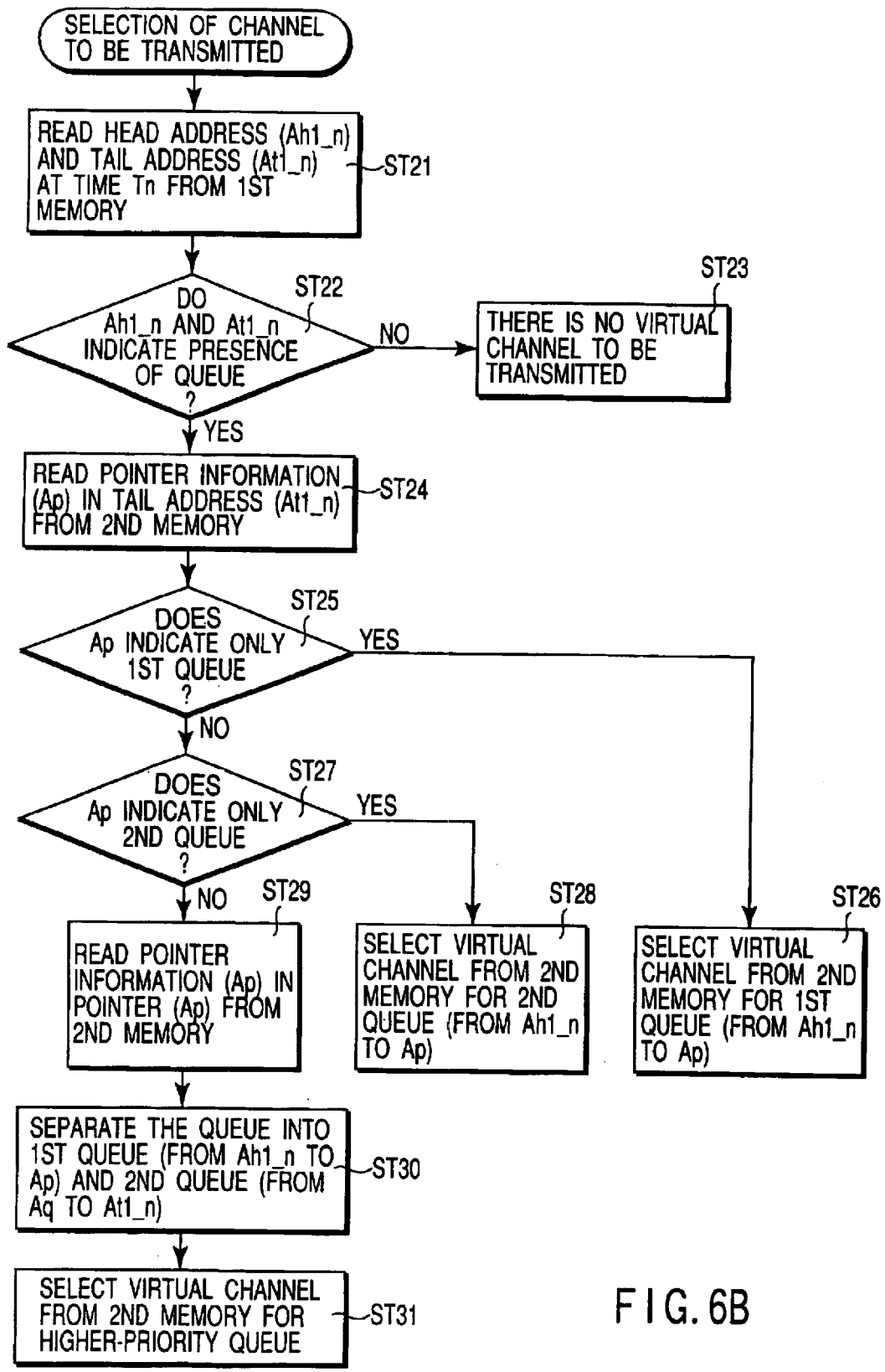
Figure 7:
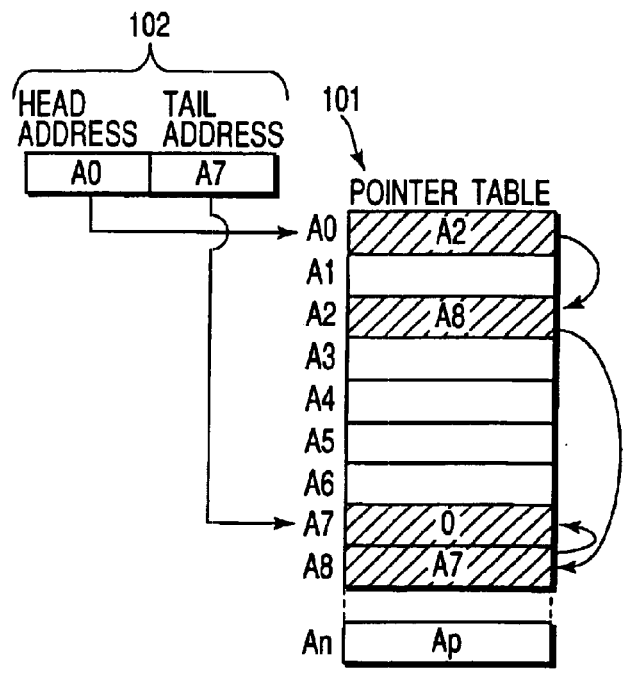
FIG. 7 is a diagram showing a conventional basic queue control method.
Figure 8:
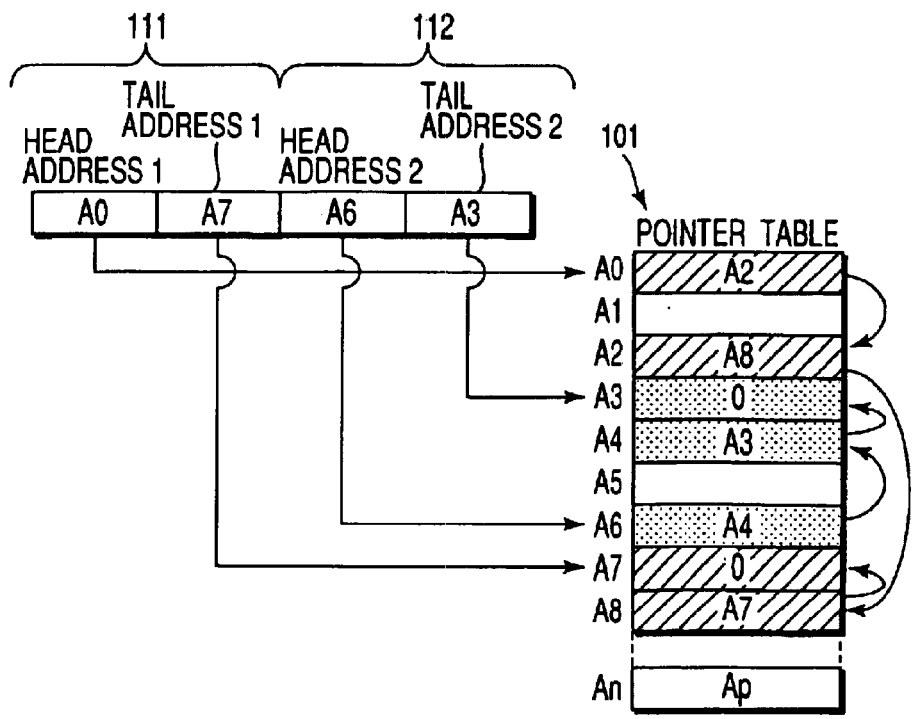
FIG. 8 is a diagram showing a conventional basic method of controlling two queues.
Figure 9:
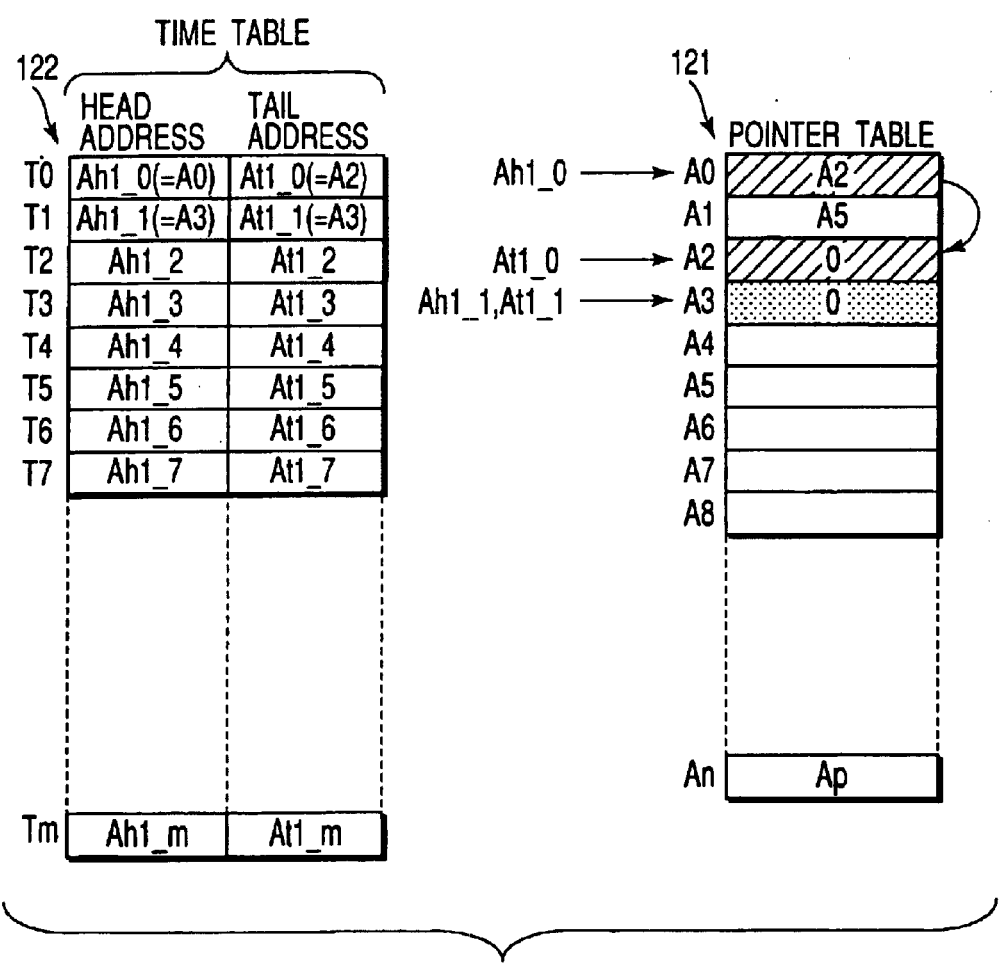
FIG. 9 is a diagram showing a conventional method of controlling a single queue using a plurality of time entries.

FIGS. 6A and 6B show the operation of the control circuit 33.

When the first and second queues are present, pointer information specifying the head element in the second queue is set in the tail element in the first queue in the pointer table 21. In the tail element in the second queue, pointer information specifying the tail element in the first queue is set. Moreover, the address specifying the head element in the first queue is stored as a head address in the time table 22a and the address specifying the tail element in the second queue is stored as a tail address in the time table 22a (ST1 to ST6).

When the first queue is absent, the address specifying the head element in the second queue is stored as a head address in the time table 22a. In addition, pointer information indicating that the first queue is absent is set in the tail element in the second queue in the pointer table 21 (ST1, ST7 to ST9).

When the second queue is absent, the address specifying the tail element in the first queue is stored as a tail address in the time table 22a. In addition, pointer information indicating that the second queue is absent is set in the tail element in the first queue in the pointer table (ST2, ST10, ST11).

The control circuit 33 accesses sequentially the time table 22a stored in the first memory 31. Then, according to the head address and tail address stored in each of the time entries, the control circuit accesses the queue in the pointer table 21 stored in the second memory 32 and outputs, for example, the number of a virtual channel.

Specifically, the control circuit reads the head address (Ah__n) and tail address (At1__n) at, for example, time Tn from the first memory 31 and judges whether or not a queue is present (ST21, ST22). If the result of the judgment has shown that there is no queue, a virtual channel will not be transmitted (ST23).

On the other hand, if the result of the judgment has shown that there is a queue, the controller reads the pointer information (Ap) in the tail address (At1__n) from the second memory 32 (ST24). The control circuit judges whether the pointer information (Ap) indicates only the first queue (ST25). If the result of the judgment has shown that only the first queue is indicated, the control circuit accesses the first queue (Ah1__n) sequentially and selects the corresponding virtual channel from the second memory 32 (ST26).

If in step ST25, the result has shown that the pointer information (Ap) does not indicate only the first queue, the control circuit judges whether the pointer information (Ap) indicates only the second queue (ST27). If the result of the judgment has shown that only the second queue is indicated, the control circuit accesses the second queue (Ah1__n) sequentially and selects the corresponding virtual channel from the second memory 32 (ST28).

If in step ST27, the result has shown that the pointer information (Ap) does not indicate only the second queue, the control circuit reads the pointer information (Ap) in the pointer (Ap) from the second memory 32 (ST29). Thereafter, the control circuit separates the queue into the first queue (Ah1__n to Ap) and second queue (Ap to At1__n) (ST30). Then, the control circuit accesses the higher-priority queue, in this case, the first queue, sequentially and selects the corresponding virtual channel from the second memory 32 (ST26).

The number of the virtual channel outputted from the control circuit 13 is supplied to the transmission control circuit 34. The transmission control circuit 34 outputs the virtual channel corresponding to the number of the virtual channel.

The first memory 31, control circuit 33, and transmission control circuit 34 have been provided in, for example, a single semiconductor chip 35. The second memory 32 has been provided on a separate semiconductor chip. The second memory 32 may be provided integrally in the semiconductor chip 35.

With the embodiment, a set of pointer information about the head address and pointer information about the tail address enables two queues to be controlled according to their priority. This prevents the storage area for storing head addresses and tail addresses from increasing, as compared with a case where the queues are controlled using pointer information about a plurality of head addresses and pointer information about a plurality of tail addresses.

Furthermore, even when one of the first and second queues in a set, or one of the first and second queues separated is gone during the processing, the head address and tail address in the storage area can control the remaining queue.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A queue control device comprising:
   a first storage area configured to store a first and a second queue, said first queue including first elements, each of said first elements having an address specifying a next element of the first elements, and said second queue including second elements, each of said second elements having an address specifying a next element of the second elements, wherein a head address of the second queue is stored in a tail element of the first elements, and a tail address of the first queue is stored in a tail element of the second elements;
   a second storage area configured to store first pointer information and second pointer information, said first pointer information being a head address specifying a head element of the first elements included in said first queue, and said second pointer information being a tail address specifying a tail element of the second elements included in said second queue; and
   a controller which is operatively connected to the first and second storage areas, controller sets a head address specifying a head element of the second elements included in said second queue in the tail element of the first elements included in said first queue stored in said first storage area and sets a tail address specifying a tail element of the first elements included in said first queue in a tail element of the second elements included in said second queue when the second queue connects to the first queue, wherein the controller controls said first and second queues according to said first pointer information and second pointer information stored in said second storage area.

2. The queue control device according to claim 1, wherein said controller, when said first queue is absent, sets not only an address specifying the head element in said second queue as said first pointer information in said second storage area but also first information indicating that said first queue is absent in the tail element in said second queue in said first storage area.

3. The queue control device according to claim 1, wherein said controller, when said second queue is absent, sets not only an address specifying the tail element in said first queue as said second pointer information in said second storage area but also second information indicating that said second queue is absent in the tail element in said first queue in said first storage area.

4. The queue control device according to claim 1, wherein said second storage area stores a plurality of pieces of said first pointer information and a plurality of pieces of said second pointer information.

5. The queue control device according to claim 1, wherein said first queue is given higher priority than said second queue.

6. The queue control device according to claim 1, wherein said first storage area stores the number of a virtual channel according to each of said elements.

7. The queue control device according to claim 6, wherein said controller is connected to a transmission control circuit, said transmission control circuit outputting a virtual channel according to a number of a virtual channel supplied from said controller.

8. The queue control device according to claim 1, wherein when separating the first queue and second queue, the controller reads the tail address of the first queue stored in the tail element of the second queue by the second pointer information of the second storage area, and reads the head address of the second queue specified by the tail address read from the tail element of the second queue.

9. The queue control device according to claim 1, wherein the second storage area has no tail address specifying the tail element of the first queue and no head address specifying the head element of the second queue.

10. A queue control device comprising:
    a first storage area configured to store a plurality of queue groups, each of said queue groups including a first and a second queue, said first queue including first elements, each of said first elements having an address specifying a next element of the first elements, and said second queue including second elements, each of said second elements having an address specifying a next element of the second elements, wherein a head address of the second queue is stored in a tail element of the first elements, and a tail address of the first queue is stored in a tail element of the second elements;
    a second storage area configured to store a time table, said time table including a plurality of time entries, each of said time entries having first pointer information and second pointer information, said first pointer information being a head address specifying the head element in said first queue in each of said queue groups and said second pointer information being a tail address specifying the tail element in said second queue in each of said queue groups; and
    a controller which is operatively connected to the first and second storage areas, controls said first and second storage areas and which sets not only a head address specifying the head element of the second elements included in said second queue in the tail element of the first elements included in said first queue in each of said queue groups stored in said first storage area but also a tail address specifying the tail element of the first elements included in said first queue in the tail element of the second elements in said second queue and controls each of said first and second queues according to said first pointer information and second pointer information when the second queue connects to the first queue.

11. The queue control device according to claim 10, wherein said controller, when said first queue is absent in each of said queue groups, sets not only an address specifying the head element in said second queue as said first pointer information in said second storage area but also first information indicating that said first queue is absent in the tail element in said second queue in said first storage area.

12. The queue control device according to claim 10, wherein said controller, when said second queue is absent in each of said queue groups, sets not only an address specifying the tail element in said first queue as said second pointer information in said second storage area but also second information indicating that said second queue is absent in the tail element in said first queue in said first storage area.

13. The queue control device according to claim 10, wherein said first queue is given higher priority than said second queue in each of said queue groups.

14. The queue control device according to claim 10, wherein said first storage area stores the number of a virtual channel according to each of said elements in each of said queue groups.

15. The queue control device according to claim 14, wherein said controller is connected to a transmission controller, said transmission controller outputting a virtual channel according to said number of a virtual channel supplied from said controller.

16. The queue control device according to claim 10, wherein when separating the first queue and second queue, the controller reads the tail address of the first queue stored in the tail element of the second queue by the second pointer information of the second storage area, and reads the head address of the second queue specified by the tail address read from the tail element of the second queue.

17. The queue control device according to claim 10, wherein the second storage area has no tail address specifying the tail element of the first queue and no head address specifying the head element of the second queue.

18. A queue control method including a first queue composed of a first elements, each of said first elements having an address specifying the next element of the first elements, and a second queue composed of a second elements, each of said second elements having an address specifying the next element of the second elements, the queue control method for connecting the first queue and the second queue comprising:

setting a head address specifying the head element of the second elements included in said second queue in the tail element of the first elements included in said first queue;

setting a tail address specifying the tail element of the first elements included in said first queue in the tail element of the second elements included in said second queue;

storing first pointer information specifying the head address in said first queue in a storage area; and storing second pointer information specifying the tail address of said second queue in the storage area.

19. The queue control method according to claim 18, further comprising the step of, when said first queue is absent, setting not only an address specifying the head address in said second queue as said first pointer information but also first information indicating that said first queue is absent in the tail element in said second queue.

20. The queue control method according to claim 18, further comprising the step of, when said second queue is absent, setting not only an address specifying the tail address in said first queue as said second pointer information but also second information indicating that said second queue is absent in the tail element in said first queue.

21. The queue control method according to claim 18, wherein the priority of said first queue is set higher than that of said second queue.

22. The queue control method according to claim 18, wherein said elements in said first and second queues are allocated the numbers of virtual channels in a one-to-one correspondence.

23. The queue control method according to claim 18, further comprising when separating the first queue and second queue, reading the tail address of the first queue stored in the tail element of the second queue by the second pointer information of the storage area, and reading the head address of the second queue specified by the tail address read from the tail element of the second queue.

24. The queue control method according to claim 18, wherein in the storing steps, no tail address in the first queue is stored in the storage area no head address in the second queue is stored in the storage area.

* * * * *